United States Patent
Knechtges

(10) Patent No.: US 8,112,210 B2
(45) Date of Patent: Feb. 7, 2012

(54) METHOD AND SYSTEM FOR CONTROLLING STATES OF TRAVEL OF A LAND CRAFT

(75) Inventor: Josef Knechtges, Mayen (DE)

(73) Assignee: Lucas Automotive GmbH (DE)

( * ) Notice: Subject to any disclaimer, the term of this patent is extended or adjusted under 35 U.S.C. 154(b) by 669 days.

(21) Appl. No.: 11/921,881

(22) PCT Filed: Jun. 8, 2006

(86) PCT No.: PCT/EP2006/005491
§ 371 (c)(1),
(2), (4) Date: Feb. 9, 2009

(87) PCT Pub. No.: WO2007/016987
PCT Pub. Date: Feb. 15, 2007

(65) Prior Publication Data
US 2009/0222185 A1    Sep. 3, 2009

(30) Foreign Application Priority Data
Jun. 9, 2005    (DE) .................. 10 2005 026 729

(51) Int. Cl.
*B60T 8/1755*    (2006.01)
*B60W 10/04*    (2006.01)
*B60W 10/18*    (2006.01)

(52) U.S. Cl. .................. 701/70; 701/41; 303/189
(58) Field of Classification Search .................. None
See application file for complete search history.

(56) References Cited

U.S. PATENT DOCUMENTS

| 5,471,388 | A  | * | 11/1995 | Zomotor et al. ............... 701/36 |
| 5,762,406 | A  |   | 6/1998  | Yasui et al. |
| RE37,522  | E  | * | 1/2002  | Karnopp et al. ............... 303/146 |
| 6,415,215 | B1 | * | 7/2002  | Nishizaki et al. ............... 701/70 |
| 6,953,230 | B2 |   | 10/2005 | Einig et al. |
| 2004/0239179 | A1 |   | 12/2004 | Kato et al. |

FOREIGN PATENT DOCUMENTS

| DE | 19963747 A1 | * | 7/2001 |
| DE | 101 32 576 A1 |   | 1/2003 |
| EP | 1 201 520 A1 |   | 5/2002 |

* cited by examiner

*Primary Examiner* — Michael J. Zanelli
(74) *Attorney, Agent, or Firm* — MacMillan, Sobanski & Todd, LLC

(57) ABSTRACT

Method and system for controlling driving conditions of a land vehicle, with which, if understeering and oversteering driving conditions exist at the same time, measures for generating braking forces and/or driving forces which counteract the understeering driving condition, and measures for controlling braking forces and/or driving forces which counteract the oversteering driving condition are carried out at the same time.

22 Claims, 11 Drawing Sheets

METHOD AND SYSTEM FOR CONTROLLING STATES OF TRAVEL OF A LAND CRAFT

CROSS-REFERENCE TO RELATED APPLICATIONS

This application is a National Stage of International Application No. PCT/EP2006/005491 filed Jun. 8, 2006, the disclosures of which are incorporated herein by reference, and which claimed priority to German Patent Application No. 10 2005 026 729.7 filed Jun. 9, 2005, the disclosures of which are incorporated herein by reference.

BACKGROUND OF THE INVENTION

The present invention relates in general to methods and systems for controlling driving conditions of a land vehicle.

Land vehicles are generally equipped with systems which enable driving conditions of the land vehicle to be controlled without the co-operation of the driver. Systems of this kind include, for example, systems for dynamic stability control, traction control, antilock braking and similar.

Systems of this kind are used, for example, in order to compensate for understeering when a land vehicle takes a bend. Understeering or an understeering driving condition is in particular to be understood as meaning that, on account of an excessively high speed, the land vehicle deviates from a radius of bend which is predetermined by the driver, skidding towards the outer edge of the bend with wheels well locked, for example; when understeering the vehicle moves via the front axle in the direction of the outer edge of the bend, the front axle loses alignment to a greater extent than the rear axle, and the land vehicle gives the impression of wanting to drive straight ahead.

In order to compensate for understeering, it is known to brake the rear wheel on the inside of the bend, preferably all wheels, apart from the front wheel on the outside of the bend, in a controlled manner. These measures counteract the understeering driving condition, in particular because the vehicle speed is reduced and the land vehicle can therefore be returned to the radius of bend which is desired by the driver. The front wheel on the outside of the bend is not braked in the process, so that this wheel maintains the best possible lateral guidance. Braking of the front wheel on the outside of the bend would be more likely to reinforce the understeering. Understeering can additionally be counteracted by reducing the driving torque at the driven front wheels in the case of front-wheel-driven land vehicles.

Systems which control driving conditions are also used in order to compensate for oversteering of land vehicles when taking a bend. Oversteering or an oversteering driving condition is in particular to be understood as meaning that, when taking a bend, the vehicle moves with the rear in the direction of the outer edge of the bend, the rear axle loses alignment to a greater extent than the front axle on bends, and the vehicle tends towards the inside of the bend, with a yawing moment directed towards the vertical axis of the vehicle in the direction of the inside of the bend acting on the land vehicle.

It is known to brake the front wheel on the outside of the bend in order to counteract oversteering. In the case of rear-wheel-driven vehicles oversteering can be compensated through a reduction of driving forces, carried out in addition, at the driven rear wheels.

In certain cases oversteering may occur while measures for compensating for understeering are being carried out. In such cases it is usual to terminate the measures used for understeering compensation so that these do not reinforce the oversteering, and to initiate measures which counteract the oversteering.

One disadvantage of this procedure lies in the fact that the land vehicle is not brought into a driving condition which is desired as a whole and the possibility of uncontrollable driving conditions occurring is more likely.

BRIEF SUMMARY OF THE INVENTION

An advantage of the present invention is to provide improved control of driving conditions of a land vehicle when understeering and oversteering.

The present invention provides a method and a system according to the independent claims in order to achieve the above object.

In the method according to the invention, by means of a first control method, which serves to compensate for understeering driving conditions of the land vehicle when taking a bend, braking forces and/or driving forces acting on wheels of the land vehicle are generated in a controlled manner, these counteracting an understeering driving condition actually existing, and by means of a second control method, which serves to compensate for oversteering driving conditions of the land vehicle when taking a bend, braking forces and/or driving torques acting on wheels of the land vehicle are generated in a controlled manner, these counteracting an oversteering driving condition actually existing. In the method according to the invention the first control method and the second control method are in particular carried out at the same time when an understeering driving condition and an oversteering driving condition exist at the same time.

The first control method preferably comprises the controlled braking at least of one wheel of the land vehicle which is on the inside of the bend, in particular the rear wheel on the inside of the bend.

At least an outside rear wheel of the land vehicle is in addition braked in a controlled manner by means of the first control method, the front wheel on the outside of the bend not being braked.

It is also possible to reduce driving forces acting on at least one driven front wheel in a controlled manner by means of the first control method.

The second control method preferably comprises the controlled braking of the front wheel of the land vehicle which is on the outside of the bend.

It is also possible for the second control method to reduce driving forces acting on at least one driven rear wheel of the land vehicle in a controlled manner. Driving forces acting on at least one driven wheel of the land vehicle are alternatively increased by means of the second control method.

The first control method is preferably carried out when a first limit value predetermined for understeering driving conditions exists or is reached.

A predetermined deviation of an actual radius of bend of the land vehicle when taking a bend from a desired radius of bend predetermined by a driver of the land vehicle can be used as the first limit value.

It is also preferable for the second control method to be carried out when a second limit value predetermined for oversteering driving conditions exists or is reached.

A predetermined yawing moment of the land vehicle about its vertical axis can be used as the second limit value.

The system according to the invention for controlling driving conditions of a land vehicle comprises a control unit and a sensor arrangement which is connected to the control unit and with which understeering and oversteering driving conditions of the land vehicle can be established or detected and, in accordance with driving conditions, signals which indicate whether understeering and/or oversteering driving conditions exist can be emitted to the control unit.

The control unit of the system according to the invention is in particular designed to generate, in response to a signal of the sensor arrangement indicating an understeering driving condition, first control signals for a brake system and/or components of the land vehicle providing (e.g. generating, transmitting and/or controlling) driving forces for wheels of the land vehicle which bring these into operating conditions which counteract the understeering driving condition actually existing, and to generate, in response to a signal of the sensor arrangement indicating an oversteering driving condition of the land vehicle, second control signals for the brake system and/or the components providing driving forces for wheels of the land vehicle which bring these into operating conditions which counteract the oversteering driving condition actually existing.

Moreover, the control unit can generate the first control signals and the second control signals at the same time if the sensor arrangement emits at least one signal which indicates the simultaneous existence of an understeering and an oversteering driving condition.

Here and in the following the term "adapted" is to be understood as meaning that the control unit is designed at least structurally in order to provide the respective indicated technical functional features. Moreover, the control unit can also be programmed in order to provide the respective indicated technical functional features, for example using software code or computer programs. The functions of the control unit are thus provided by a corresponding hardware structure (e.g. ASIC). The control unit can also be designed so that it has a hardware structure which can be generally used and which, in conjunction with corresponding programming (e.g. permanently implemented software code, computer program provided on a computer-readable storage medium, for operating downloadable software code or a computer program), provides the technical functional features of the control unit.

The control unit can preferably generate a control signal which is comprised by the first control signal in order to indicate to the brake system that at least one wheel of the land vehicle which is on the inside of the bend, preferably the rear wheel on the inside of the bend, is to be braked in a controlled manner.

The control unit can also generate a control signal which is comprised by the first control signal for the brake system in order to brake a rear wheel of the land vehicle which is on the outside of the bend in a controlled manner and in so doing to prevent braking of the outside front wheel.

The control unit can be designed in order to generate, for at least one of the components providing driving forces for wheels of the land vehicle, a control signal which is comprised by the first control signal in order to reduce driving forces acting on at least one driven front wheel in a controlled manner.

The control unit can generate the second control signals so that they comprise a control signal for the brake system in order to brake a front wheel of the land vehicle which is on the outside of the bend in a controlled manner.

The control unit can generate a control signal which is comprised by the second control signal for at least one of the components providing driving forces in order either to reduce driving forces at least at one driven rear wheel of the land vehicle in a controlled manner or to increase driving torques at least at one driven wheel of the land vehicle in a controlled manner.

The control unit is preferably designed in order to generate the first and second control signals when at least one of the above-mentioned first and second limit values exists or is reached.

Advantages of this invention will become apparent to those skilled in the art from the following detailed description of the preferred embodiments, when read in light of the accompanying drawings.

BRIEF DESCRIPTION OF THE DRAWINGS

The following description of preferred embodiments refers to the accompanying drawings, of which.

DETAILED DESCRIPTION OF THE INVENTION

Figure 1:
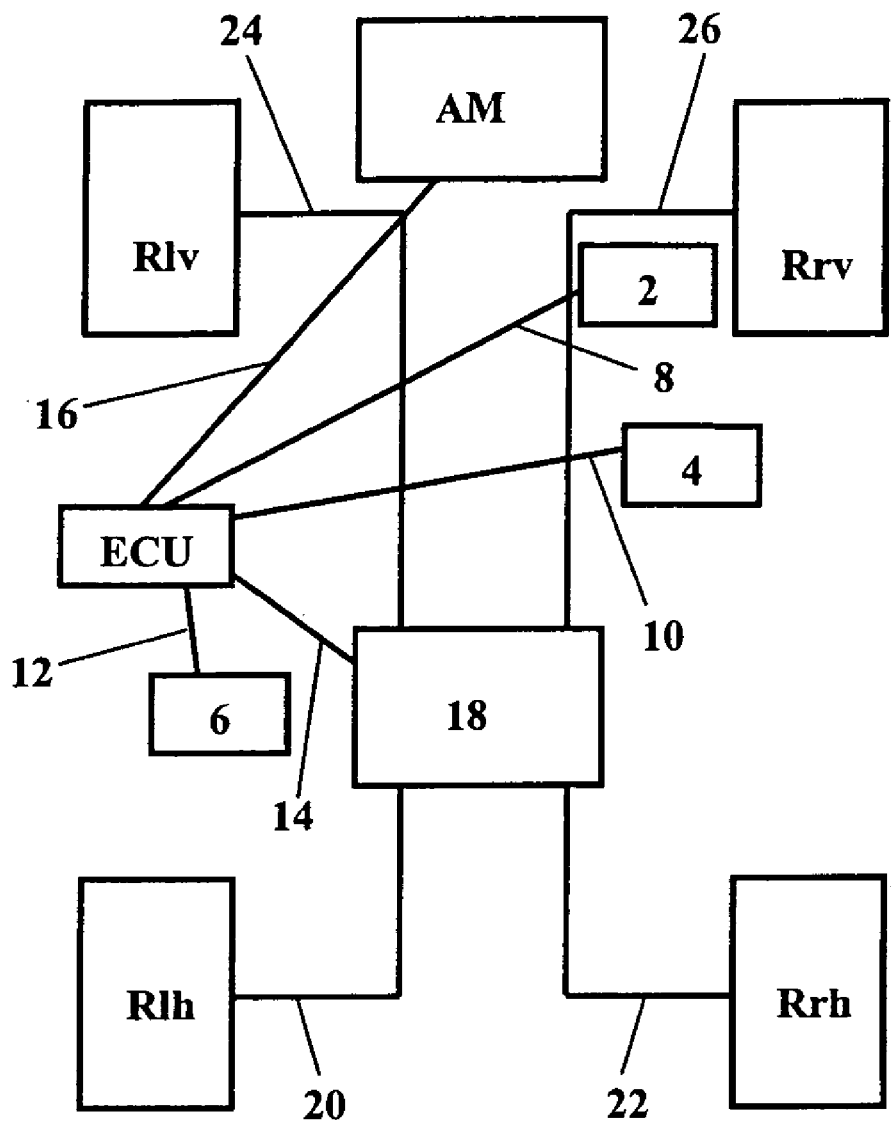
FIG. 1 is a schematic representation of a preferred embodiment of the system according to the invention and components of a land vehicle which are used with the latter.

FIG. 1 shows a preferred embodiment of a system for controlling driving conditions of a land vehicle. The system comprises a control unit ECU and a sensor arrangement (not marked) comprising sensor units 2, 4 and 6.

The sensor unit 2, which can comprise one or more sensor(s), serves to detect a radius of bend predetermined by a driver for taking a bend. The sensor unit 2 can, for example, detect positions of the steering wheel (not shown), positions of the steering linkage (not shown) and/or positions of the steered wheels.

The sensor unit 4, which can comprise one or a plurality of sensor(s), serves to detect radii of bend actually existing when taking a bend. The wheel speed sensors which are in any case necessary for ABS control, for example, can be used for this purpose. In this respect the difference in the wheel speeds between the wheels on the inside of the bend and the wheels on the outside of the bend are increased.

The sensor unit 6, which can comprise one or a plurality of sensor(s), serves to detect yawing forces acting on the land vehicle about its vertical axis. The sensor unit 6 can, for example, comprise a yawing moment sensor.

Signals which are emitted by the sensor units 2, 4 and 6 and which indicate the measured quantities thereof detected in each case are transmitted via hard-wire and/or wireless signal paths 8, 10 and 12 to the control unit ECU.

Signals of the control unit ECU which serve to control driving conditions of the land vehicle are transmitted via hard-wire and/or wireless signal paths 14 and 16.

The signal path 14 is provided for first control signals of the control unit ECU in order to control a brake system of the land vehicle. The first control signals can be provided for a control unit (not shown), if provided, of the brake system which, in response to these, controls further components, in particular valve arrangements, of the brake system accordingly. If the control unit ECU at least partly controls the brake system, the brake system (for example valve arrangements of the brake system) can be at least partly directly controlled by means of the first control signals.

The signal path 16 serves to transmit second control signals. By means of the second control signals, components AM of the land vehicle which provide (e.g. generate, transmit, control) driving forces for vehicle wheels can be controlled by the control unit ECU. Components of this kind include, for example, vehicle motors, gear units, clutches, engine management systems and, in the case of four-wheeldriven land vehicles, components which distribute driving forces to front and rear wheels.

A control unit 18 and hydraulic connections 20, 22, 24, 26 of the brake system which is taken as a basis in the following are shown in FIG. 1. Hydraulic fluid can be supplied to and removed from wheel brakes (not shown) associated with vehicle wheels Rlv, Rrv, Rlh and Rrh) via the hydraulic connections 20, 22, 24 and 26 in order to enable brake pressure to be built up and reduced in the wheels.

Driving conditions of the land vehicle which actually exist at the time are detected by means of the sensor units 2, 4 and 6. If an understeering and/or an oversteering driving condition is detected when taking a bend, the brake system and/or at least one component providing driving forces is controlled by means of the control unit ECU in order to counteract the understeering, the oversteering or both driving conditions.

Figure 2:
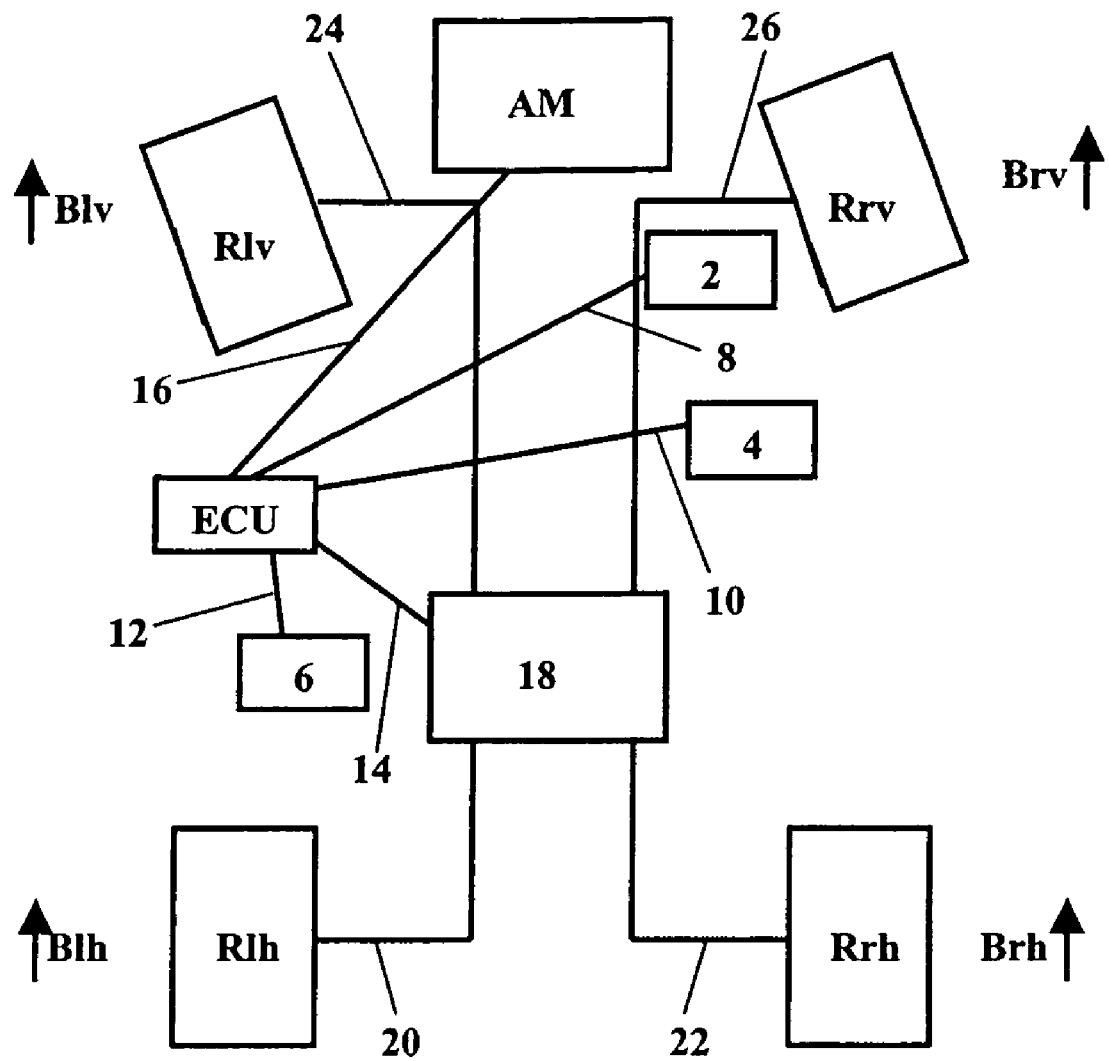
FIGS. 2 to 11 are schematic representations for the purpose of illustrating preferred embodiments of the present invention.
Figure 3:
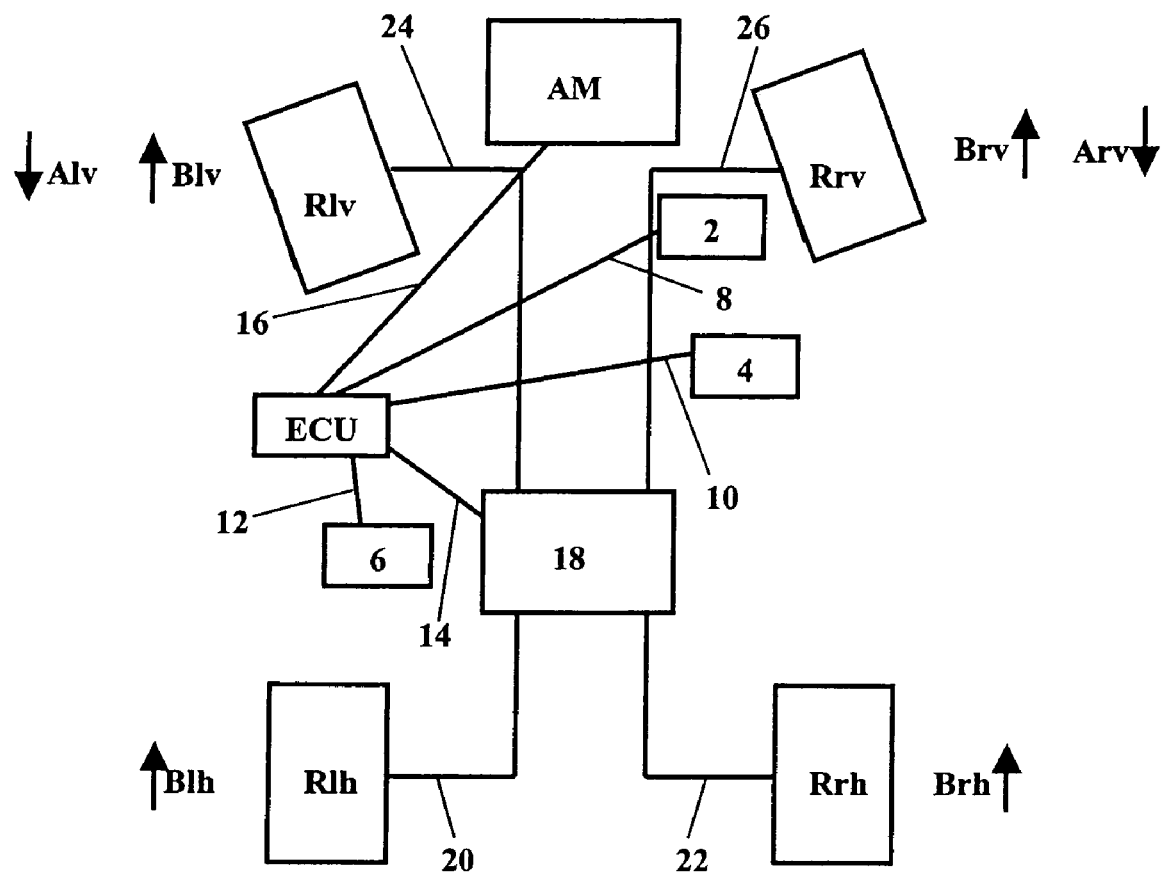
Figure 4:
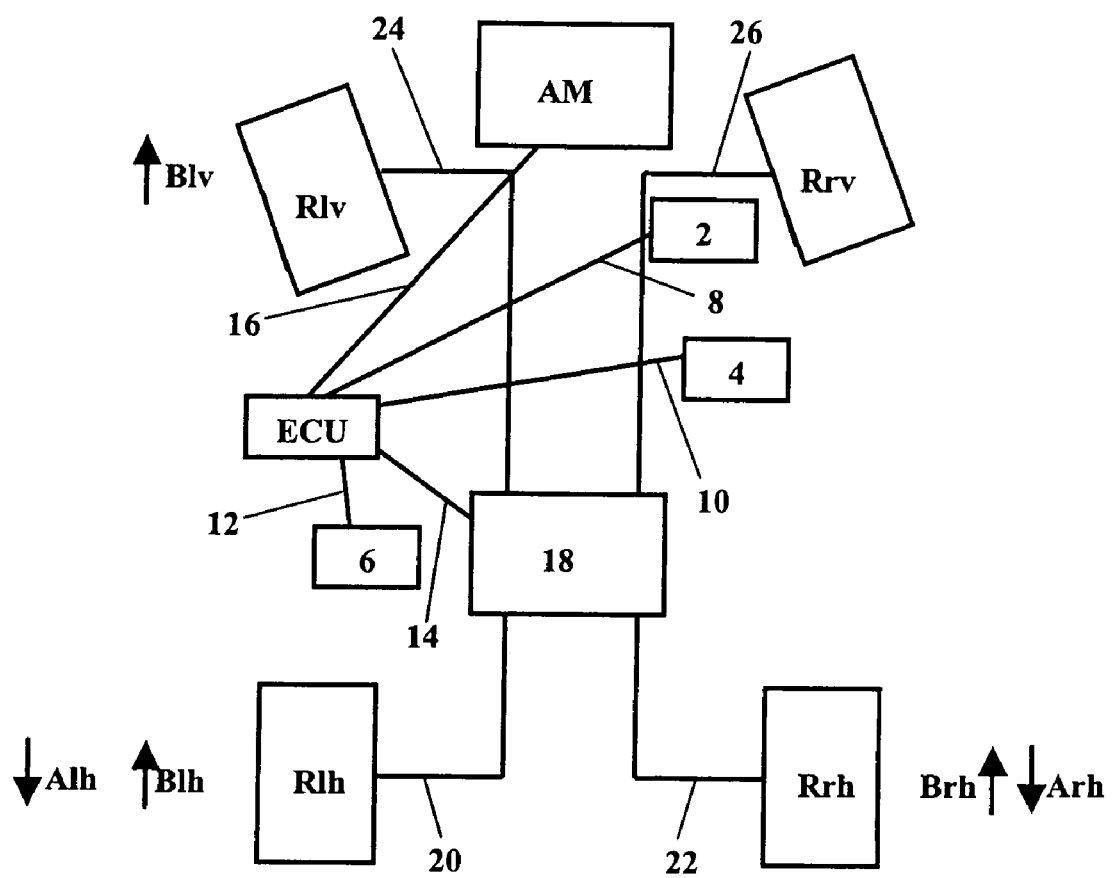
Figure 5:
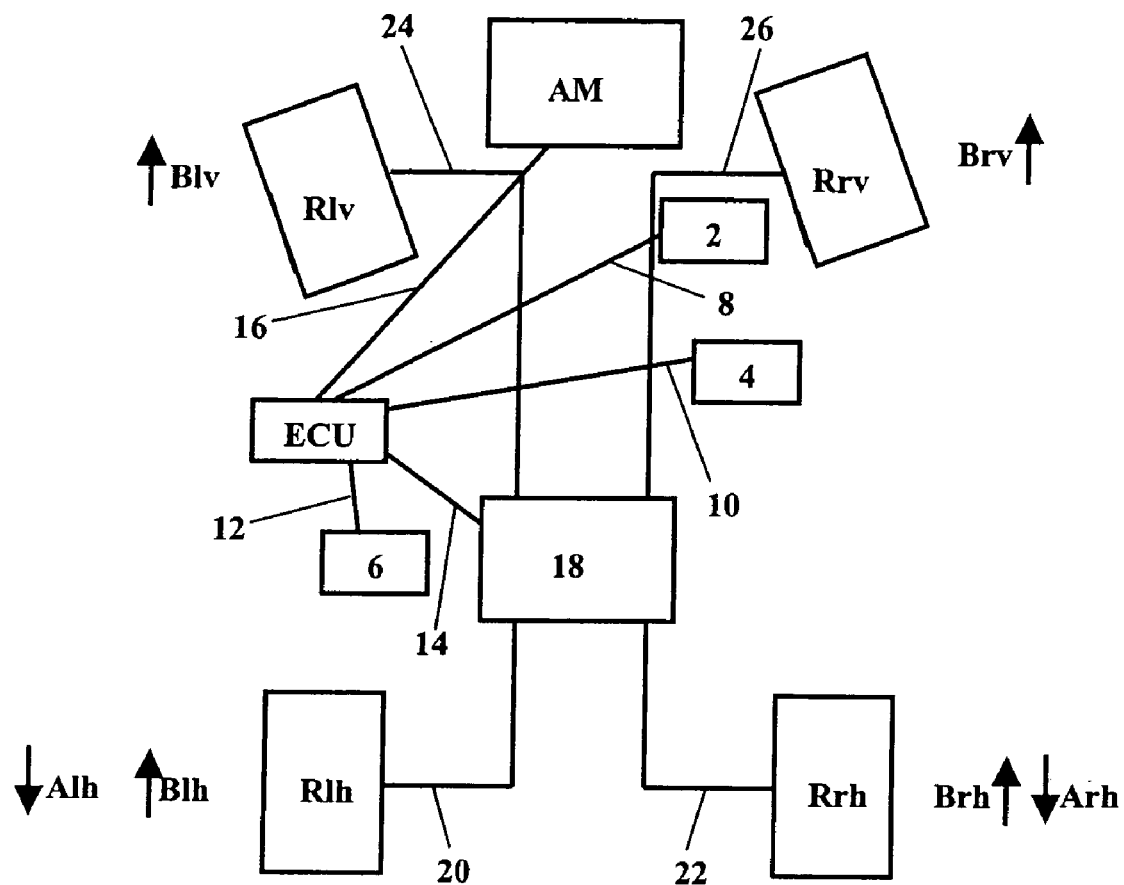
Figure 6:
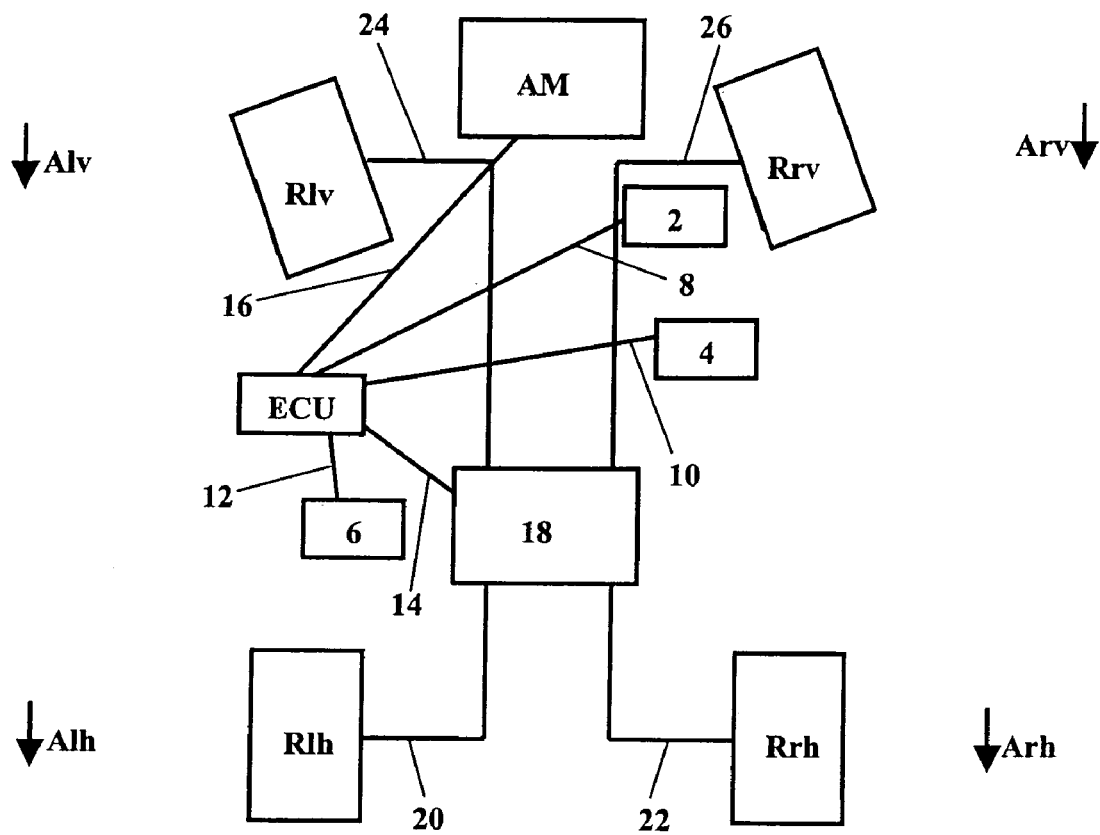
Figure 7:
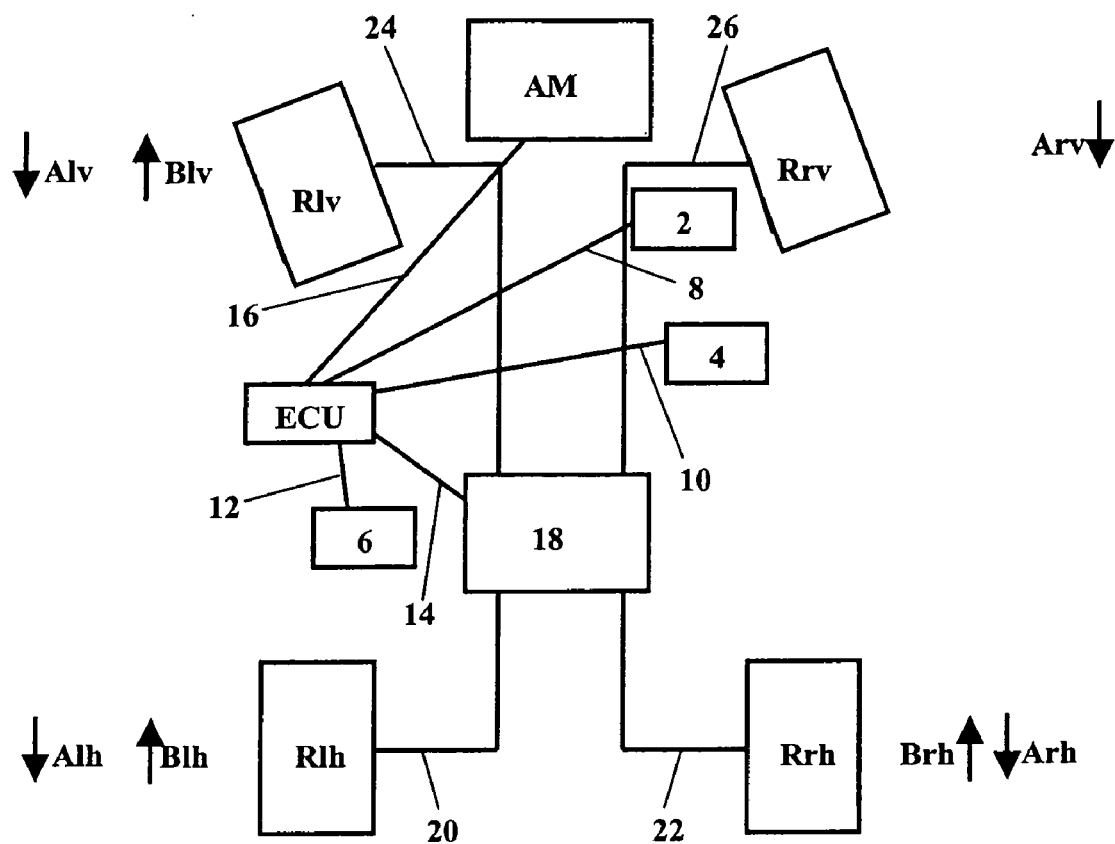
Figure 8:
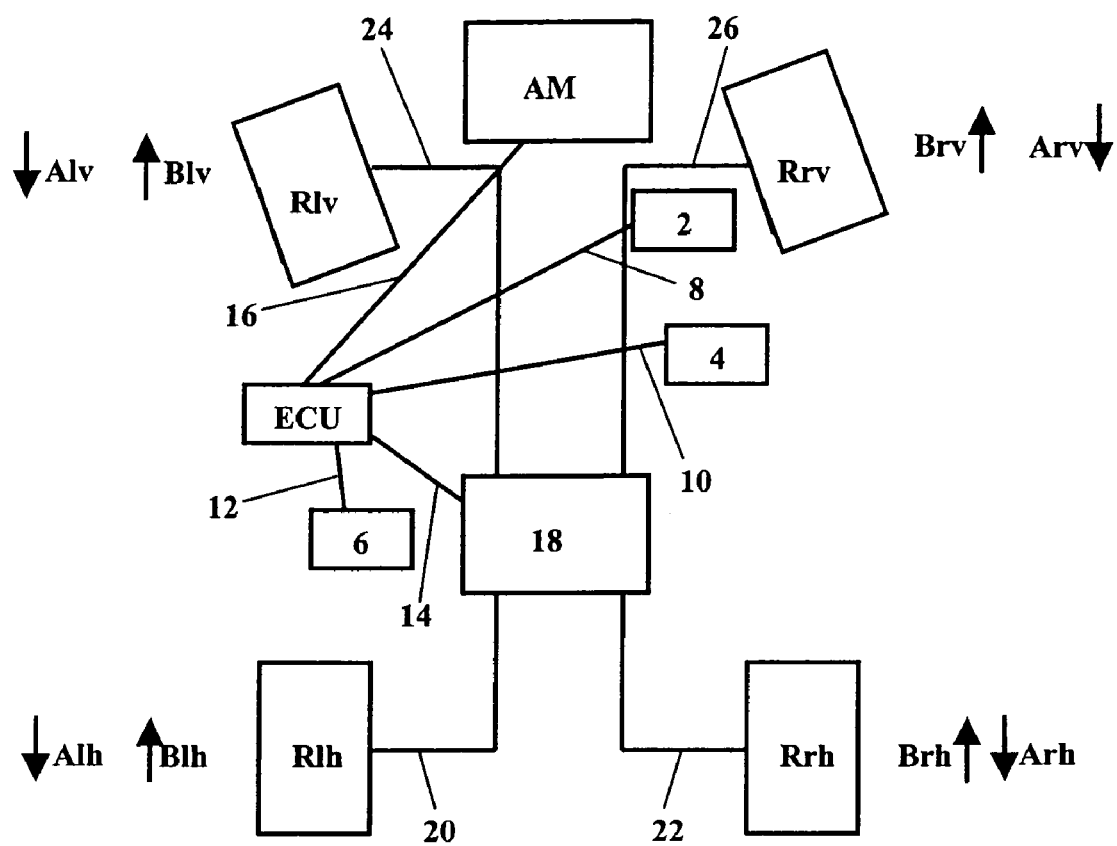
Figure 9:
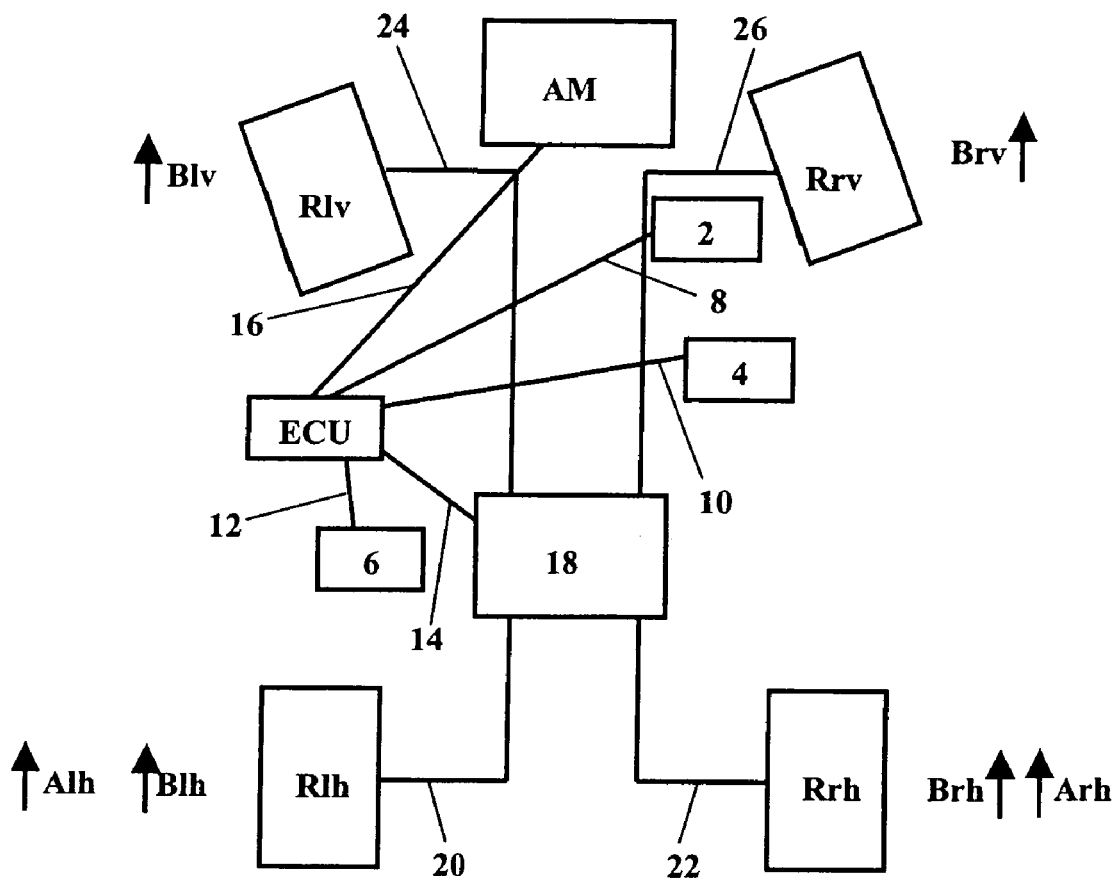
Figure 10:
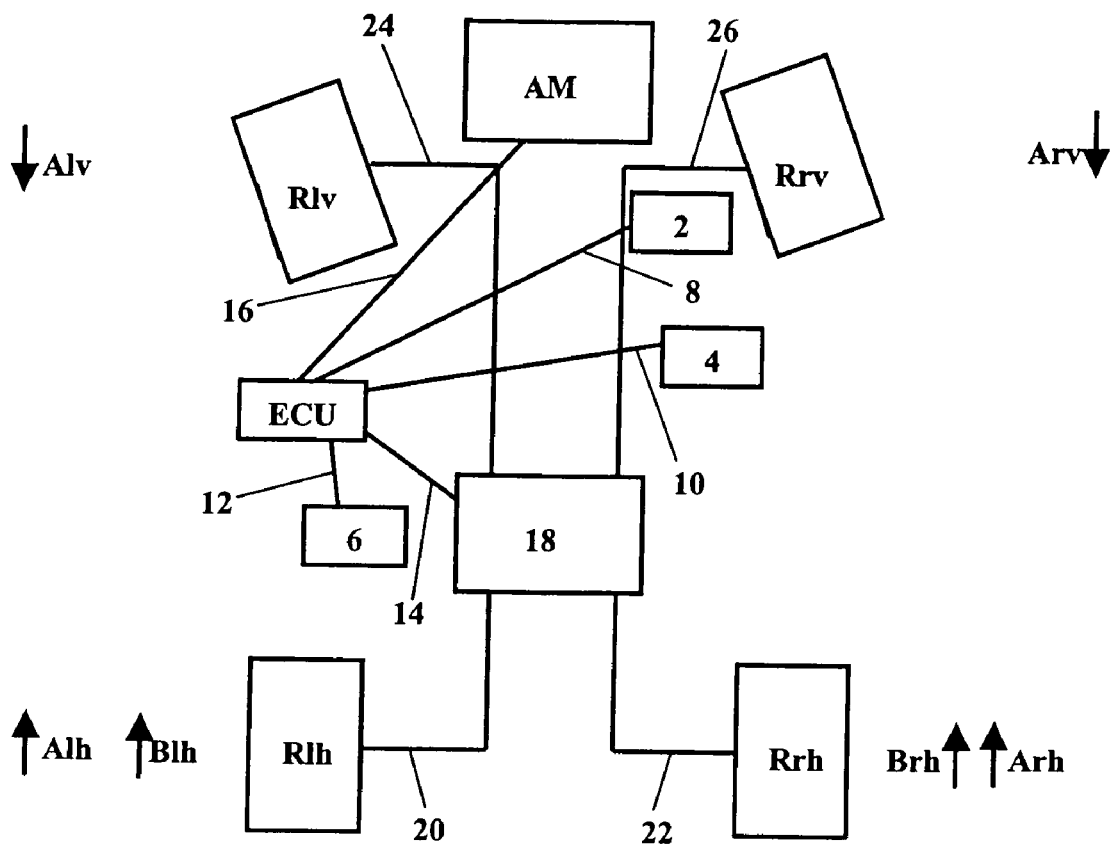
Figure 11:
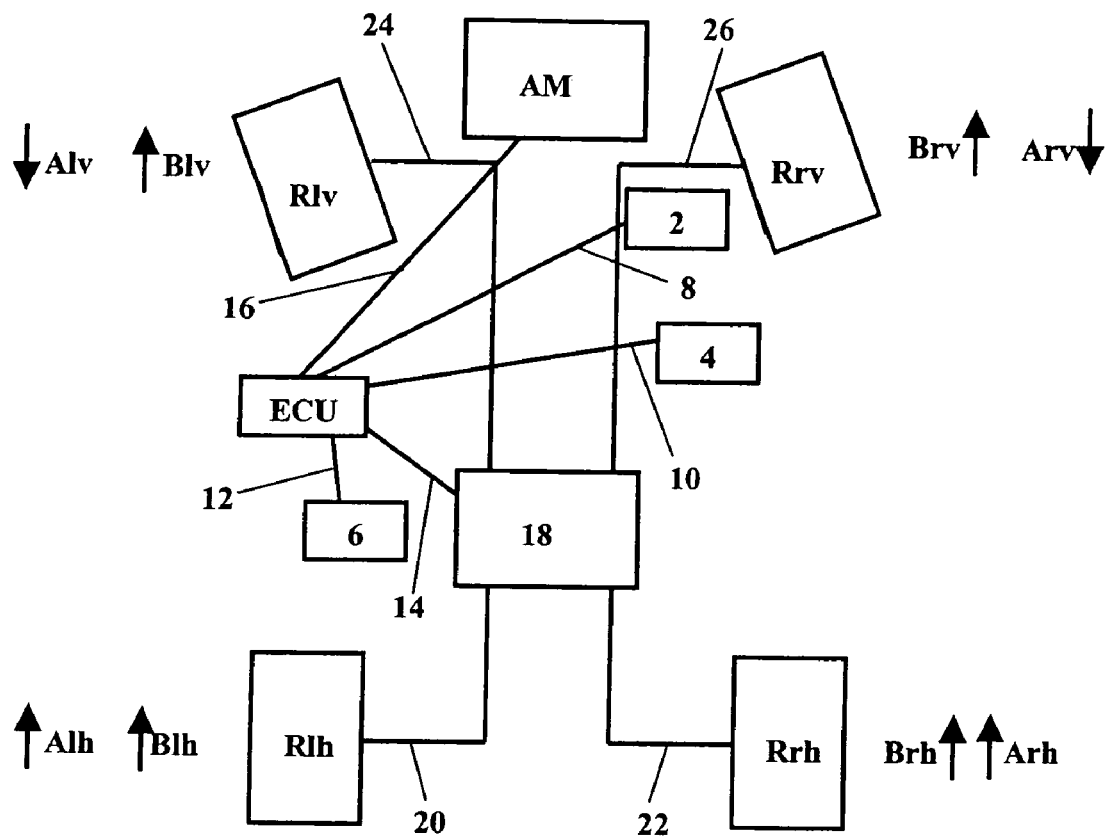

Preferred embodiments of a control of this kind of driving conditions are described in the following. The embodiment which is illustrated by FIG. 2 is suitable for use by front-wheel drive, rear-wheel drive or four-wheel drive vehicles. A front-wheel drive vehicle is taken as a basis in the embodiment which is illustrated by FIG. 3. A rear-wheel drive vehicle is taken as a basis in the embodiments which are illustrated by FIGS. 4 and 5. A rear-wheel drive vehicle is taken as a basis in the embodiments which are illustrated by FIGS. 6, 7 and 8, wherein oversteering driving conditions can occur here partly through a reduction of driving forces at vehicle wheels. A rear-wheel-driven vehicle is likewise taken as a basis in the embodiments which are illustrated by FIGS. 9, 10 and 11, wherein oversteering driving conditions can be additionally compensated here by increasing driving forces at driving conditions.

The basis in all cases is a forward moving land vehicle taking a bend to the left, with statements in this respect applying accordingly to a vehicle taking a bend in the opposite direction.

Upward directed arrows in the figures indicate an increase in braking forces or driving forces. Downward directed arrows in the figures indicate a reduction of braking forces or driving forces.

If understeering is established in the case of a vehicle taking a bend to the left, according to the embodiment of FIG. 2, braking forces Blv, Blh and Brh are generated at the front wheel Rlv on the inside of the bend, the rear wheel Rlh on the inside of the bend and the rear wheel Rrh on the outside of the bend by means of the control unit ECU, which forces brake these wheels in a controlled manner so that forces which counteract the understeering act on the land vehicle.

If it is established, while controlling the brake system for compensating for the understeering driving condition, that oversteering is occurring, braking forces Brv are generated at the front wheel Rrv on the outside of the bend by means of the control unit ECU, which forces result in driving forces which counteract the oversteering acting on the land vehicle.

In contrast to the previous procedure of terminating measures for compensating for understeering and subsequently carrying out only measures for compensating for oversteering, the present invention enables the measures for compensating for oversteering, in particular a reduction of the vehicle speed, to be continuously carried out, namely independently of measures for compensating for oversteering.

In the embodiment which is illustrated by FIG. 2 and in embodiments which are described in the following, in which the front wheel on the outside of the bend is braked in a controlled manner when compensating for oversteering and understeering driving conditions, the vehicle is further decelerated by the additionally braked wheel, which can represent supplementary compensation with regard to understeering driving conditions.

The embodiment which is illustrated by FIG. 3 differs from the embodiment according to FIG. 2 in that, in addition to the braking forces generated for compensating for the understeering, driving forces Alv and Arv acting on the driven front wheels Rlv and Rrv are reduced for understeering compensation.

In the embodiment which is illustrated by FIG. 4 understeering compensation takes place as explained with reference to FIG. 2. In order to compensate for an oversteering driving condition (occurring at the same time as understeering), driving forces Alh and Alrh acting on the rear wheels Rlh and Rrh are reduced, as indicated by the downward pointing arrows.

In the embodiment which is illustrated by FIG. 5 an understeering driving condition is compensated as explained with reference to FIG. 2. In order to compensate for oversteering, in this embodiment, as explained with reference to FIG. 2, braking forces Brv acting on the front wheel Rrv on the outside of the bend are generated and, as explained with reference to FIG. 4, driving forces Alh and Arh acting on the rear wheels Rlh and Rrh are reduced. This generation of braking forces and reduction of driving forces can be initiated at the same time or in succession.

In the embodiment which is illustrated by FIG. 6, in order to compensate for an understeering driving condition, as explained with reference to FIG. 3, driving forces Alv and Arv at the front wheels Rlv and Rrv are reduced. In order to compensate for oversteering, in this embodiment, as explained with reference to FIG. 4, driving forces Alh and Arh acting on the rear wheels Rlh and Rrh are reduced.

The embodiment which is illustrated by FIG. 7 differs from the embodiment explained with reference to FIG. 3 in that oversteering is compensated by reducing driving forces Alh and Arh acting on the rear wheels Rlh and Rrh.

The embodiment which is illustrated by FIG. 8 uses the compensation for an understeering driving condition which is explained with reference to FIGS. 3 and 7 and the compensation for an oversteering driving condition which is explained with reference to FIG. 5.

In contrast to the embodiments described above, in the embodiments which are illustrated by FIGS. 9, 10 and 11 an increase in driving forces is used with regard to compensating for oversteering driving conditions by controlling driving forces acting on vehicle wheels.

In order to compensate for understeering driving conditions, in the embodiment which is illustrated by FIG. 9 a generation of braking forces explained with reference to FIG. 2 is used, in the embodiment which is illustrated by FIG. 10 a reduction of driving forces explained with reference to FIG. 6 is used and in the embodiment which is illustrated by FIG. 11 an increase in braking forces and a reduction of driving forces explained with reference to FIG. 3 are used.

In the embodiments of FIGS. 9, 10 and 11 oversteering driving conditions are compensated by generating braking forces Brv at the front wheel Rrv on the outside of the bend and increasing driving forces at least at one driven wheel. In this respect the generation of braking forces is initiated prior to the increase in driving forces, this is carried out in a reverse order or both measures are initiated at the same time.

In accordance with the provisions of the patent statutes, the principal and mode of operation of this invention have been explained and illustrated in its preferred embodiments. However, it must be understood that this invention may be practiced otherwise than as specifically explained and illustrated without departing from its spirit or scope.

The invention claimed is:

1. A method for controlling driving conditions of a land vehicle, comprising:
  a first control method for understeering driving conditions of the land vehicle when taking a bend for generating braking forces and/or driving forces acting on wheels of the land vehicle in a controlled manner when an understeering driving condition exists, these counteracting the understeering driving condition; and a second control method for oversteering driving conditions of the land vehicle when taking a bend for generating braking forces and/or driving forces acting on wheels of the land vehicle in a controlled manner when an oversteering driving condition exists, these counteracting the oversteering driving condition, wherein the first control method and the second control method are carried out at the same time and wherein the first and the second control methods in this case generate in a controlled manner braking forces which act on a front wheel inside of the bend, a rear wheel inside of the bend, a front wheel outside of the bend and a rear wheel outside of the bend when the understeering driving condition and the oversteering driving condition exist at the same time.

2. The method according to claim 1, wherein the first control method comprises the controlled braking at least of one wheel of the land vehicle which is on the inside of the bend.

3. The method according to claim 1, wherein the first control method comprises the controlled braking of the rear wheel of the land vehicle which is on the outside of the bend.

4. The method of claim 1, wherein the first control method comprises the controlled reduction of driving torques at least at one driven front wheel.

5. The method of claim 1, wherein the second control method comprises the controlled braking of the front wheel of the land vehicle which is on the outside of the bend.

6. The method according to claim 1, wherein the second control method comprises the controlled reduction of driving forces at least at one driven rear wheel.

7. The method according to claim 1, wherein the second control method comprises the controlled increase of driving forces at least at one driven wheel.

8. The method according to claim 1, wherein the first control method is carried out when a first limit value for understeering driving conditions exists.

9. The method according to claim 8, wherein the first limit value indicates a deviation of a radius of bend actually existing when the land vehicle takes a bend from a radius of bend predetermined by a driver of the land vehicle.

10. The method according to claim 1, wherein the second control method is carried out when a second limit value for oversteering driving conditions exists.

11. The method according to claim 10, wherein the second limit value indicates a predetermined yawing moment of the land vehicle about its vertical axis.

12. A system for controlling driving conditions of a land vehicle, comprising;
a control unit (ECU); and
a sensor arrangement which is connected to the control unit (ECU) for detecting understeering and oversteering driving conditions of the land vehicle and for emitting signals to the control unit which indicate an understeering driving condition and/or an oversteering driving condition, wherein the control unit (ECU) is designed to generate, in response to a signal of the sensor arrangement indicating an understeering driving condition, first control signals for a brake system and/or components of the land vehicle providing driving forces for wheels of the land vehicle in order to control these so that they counteract the understeering driving condition, and wherein the control unit (ECU) is designed to generate, in response to a signal of the sensor arrangement indicating an oversteering driving condition, second control signals for the brake system and/or components of the land vehicle providing driving forces for wheels of the land vehicle in order to operate these so that they counteract the oversteering driving condition, and wherein the control unit (ECU) is designed to generate the first control signals and the second control signals at the same time and in this case to brake in a controlled manner a front wheel inside of the bend, a rear wheel inside of the bend, a front wheel outside of the bend and a rear wheel outside of the bend if a signal of the sensor arrangement indicates the simultaneous existence of an understeering driving condition and an oversteering driving condition.

13. The system according to claim 12, wherein the control unit (ECU) is designed to generate a control signal which is comprised by the first control signals in order to brake at least one wheel of the land vehicle which is on the inside of the bend in a controlled manner.

14. The system according to claim 12, wherein the control unit (ECU) is designed to generate a control signal which is comprised by the first control signal in order to brake a rear wheel of the land vehicle which is on the outside of the bend in a controlled manner.

15. The system according to claim 12, wherein the control unit (ECU) is designed to generate a control signal which is comprised by the first control signal for at least one of the components providing driving forces for wheels of the land vehicle in order to reduce driving forces at least at one driven front wheel of the land vehicle in a controlled manner.

16. The system according to claim 12, wherein the control unit (ECU) is designed to generate a control signal which is comprised by the second control signal in order to brake a front wheel of the land vehicle which is on the outside of the bend in a controlled manner.

17. The system according to claim 12, wherein the control unit (ECU) is designed to generate a control signal which is comprised by the second control signals for at least one of the components providing driving forces for wheels of the land vehicle in order to reduce driving forces at least at one driven rear wheel of the land vehicle in a controlled manner.

18. The system according to claim 12, wherein the control unit (ECU) is designed to generate a control signal which is comprised by the second control signals for at least one of the components providing driving forces for wheels of the land vehicle in order to increase driving forces at least at one driven wheel of the land vehicle in a controlled manner.

19. The system according to claim 12, wherein the sensor arrangement is designed to emit a signal indicating an understeering driving condition of the land vehicle when a first limit value predetermined for understeering driving conditions exists.

20. The system according to claim 19, wherein the first limit value indicates a predetermined deviation of an actual radius of bend existing when the land vehicle takes a bend from a radius of bend predetermined by a driver of the land vehicle.

21. The system according to claim 12, wherein the sensor arrangement is designed to emit a signal indicating an oversteering driving condition of the land vehicle when a second limit value predetermined for oversteering driving conditions exists.

22. The system according to claim 21, wherein the second limit value indicates a predetermined yawing moment of the land vehicle about its vertical axis.

* * * * *